3,459,713
PROCESS FOR THE PREPARATION OF MOLDED PLASTICS BASED ON SOLID TRIGLYCIDYL ISOCYANURATES
Herbert Saran and Manfred Budnowski, Dusseldorf-Holthausen, Germany, assignors to Henkel & Cie GmbH, Holthausen, Germany, a corporation of Germany
No Drawing. Filed July 24, 1967, Ser. No. 655,325, Claims priority, application Germany, Aug. 18, 1966, H 60,271
Int. Cl. C08g 30/08, 45/06
U.S. Cl. 260—77.5
9 Claims

ABSTRACT OF THE DISCLOSURE

A process which comprises the steps of (1) preparing at least one prereaction molded plastic based on solid triglycidyl isocyanurate as a first reactive ingredient and an organic carboxylic acid anhydride epoxide resin hardener as a second reactive ingredient, by reacting from 1% to 25% by weight of the total amount of one of said reactive ingredients with the substantial entirety of the other of said reactive ingredients at elevated temperatures, (2) cooling and subdividing said prereaction molding plastic, (3) adding the remainder of said reactive ingredients and customary epoxide resin adjuvants and (4) recovering a stable molded plastic premix hardenable to a hardened epoxide resin.

CLAIM FOR PRIORITY

The right of priority under provisions of 35 USC 119 is hereby claimed on the corresponding German patent application H 60,271, filed Aug. 18, 1966 on our behalf.

THE PRIOR ART

It is well known to subject mixtures consisting of epoxide compounds, hardeners and fillers, which are to be formed into molded plastics, to a controlled prereaction. By this measure, suitable working properties, such as, for example, the pourability, and desired end characteristics of the molded components can be predetermined. However, on utilization of this method, products are obtained which usually have only a limited storability.

In that case where this method is employed for the preparation of molded plastics based on triglycidyl isocyanurates, prereaction substances of only very poor storability are obtained.

Furthermore, it is known to obtain more stable materials by physically admixing a solid epoxide resin, solid amine or an acid anhydride epoxide hardener and solid fillers. However, when this method is employed for the preparation of molded plastics based on triglycidyl isocyanurate, the initial viscosity of the organic phase of the hardenable mixture is so low, that it partly flows out of the casting mold during the molding process.

OBJECTS OF THE INVENTION

An object of the invention is to prepare molded plastic premixes based on solid triglycidyl isocyanurate, which possesses a prolonged storability as well as a marked initial viscosity when heated to molding temperatures during the molding process.

Another object of the invention is the development of a process for the preparation of a stable molded plastic premix hardenable to a hardened epoxide resin, based on organic compounds containing more than one epoxide group in the molecule and containing from 66⅔% to 100% of solid triglycidyl isocyanurates, and organic carboxylic acid anhydride epoxide resin hardeners which comprises the steps of (1) preparing at least one prereaction molded plastic based on said solid triglycidyl isocyanurate as a first reactive ingredient and said organic carboxylic acid anhydride epoxide resin hardener as a second reactive ingredient, by reacting from 1% to 25% by weight of the total amount of one of said reactive ingredients with the substantial entirety of the other of said reactive ingredients at elevated temperatures, (2) cooling and subdividing said prereaction molded plastic, (3) adding the remainder of said reactive ingredients and customary epoxide resin adjuvants and (4) recovering said stable molded plastic premix hardenable to a hardened epoxide resin.

A further object of the invention is the obtention of a stable molded plastic premix prepared by the above process which is hardenable to a hardened epoxide resin, as well as the hardened epoxide resin so produced.

These and other objects of the present invention will become more apparent as the description thereof proceeds.

DESCRIPTION OF THE INVENTION

These objects of the invention have been obtained in that, in the hardenable epoxide mixture containing solid triglycidyl isocyanurate and organic carboxylic acid anhydrides selected from the group consisting of organic dicarboxylic acid anhydrides and organic polycarboxylic acid polyanhydrides, to begin with, 1% to 25% of the triglycidyl isocyanurate is reacted with substantially all of the carboxylic acid anhydride and/or 1% to 25% of the carboxylic acid anhydride is reacted with substantially all of the triglycidyl isocyanurate, and that, thereafter, the one or several prereaction products are admixed with the other components of the hardenable epoxide mixture.

The triglycidyl isocyanurate, to be used according to the process of the invention, should be present in solid form. Preferably, the triglycidyl isocyanurate should be crystallized and should have an epoxide-oxygen content of at least 14%. The preparation of the solid as well as the crystallized triglycidyl isocyanurate is well known as such. By treatment, possibly repeated, of the crude reaction product, which is obtained, for example, by the reaction of cyanuric acid with an excess of epichlorohydrin, with an alkali metal hydroxide, a suitable solid triglycidyl isocyanurate can be obtained. By means of one or repeated recrystallizations from suitable solvents, such as methanol, the preferred crystalline triglycidyl isocyanurate can be obtained from the crude products, having a content of more than 14% of epoxide oxygen. Processes for preparing these products are described in the commonly-assigned U.S. patent application Ser. No. 292,725, filed July 3, 1963 and U.S. Patent No. 3,288,789.

As suitable carboxylic acid anhydride epoxide hardeners for the process of the invention are organic carboxylic acid anhydrides selected from the group consisting of dicarboxylic acid anhydrides and polycarboxylic acid polyanhydrides. Among the dicarboxylic acid anhydrides are, for example, hexahydrophthalic acid anhydride, tetrahydrophthalic acid anhydride, phthalic acid anhydride, methylcyclohexanedicarboxylic acid anhydride, dodecenylsuccinic acid anhydride, endomethylenetetrahydrophthalic acid anhydride, methylendomethylenetetrahydrophthalic acid anhydride and succinic acid anhydride. Among the polycarboxylic acid polyanhydrides are, for example, pyromellitic acid anhydride. The total amount of the carboxylic acid anhydride to be used shall be measured so, that 0.6 to 1.2, preferably 0.8 to 0.9 carboxylic acid anhydride groups per molecule are allotted to each epoxide group in the molecule.

Furthermore, customary epoxide hardening accelerating agents may be added to the mixtures, such as, for example, trimethylbenzylammonium chloride or triphenylphosphine or dicyanodiamide. This latter can be used advantageously at an amount of about 0.5 to 5% by weight, based on the triglycidyl isocyanurate.

For the preparation of the molded plastic premixes fillers can also be utilized such as, for example, ground shale, steatite powder, asbestos powder or asbestos fibers, glass powder or glass fibers, barium sulfate, mica, koalin, quartz powder, titanium oxide, aluminum oxide, ground dolomite, calcium carbonate or other natural or synthetic fibrous materials. If so desired, metal powders such as aluminum, iron, titanium or the like, can be incorporated in the molded plastic premixes.

It is of further advantages to add known epoxide resin lubricants, stabilizers, dyes or plasticizers to the molded plastic premixes.

The molded plastic premixes of the invention based on solid triglycidyl isocyanurate can also be modified by the addition of other organic compounds containing more than one epoxide group in the molecule. These epoxides can replace the triglycidyl isocyanurate up to about ⅓ of the total epoxide compounds present. For this purpose, diglycidyl ethers of polyhydric phenols, for example, diglycidyl ether of diphenylol propane with an epoxide equivalent of from 170 to 1200 are suitable. Other suitable epoxide compounds are the cycloaliphatic epoxide compounds, for example, 3,4-epoxy-6-methyl-hexahydrobenzyl 3',4'-epoxy-6'-methyl-hexahydrobenzoate or the diepoxide of the acetal of cyclohexenealdehyde and 1,1-dimethylol-cyclohexene.

For the preparation of the molded plastic premixes of the invention, to form the prereaction products about 1% to 25%, preferably 2% to 10% by weight of the total amount of the carboxylic acid anhydride is reacted with substantially all of the solid triglycidyl isocyanurate or 1% to 25%, preferably 2% to 10% by weight of the total amount of triglycidyl isocyanurate is reacted with substantially all of the carboxylic acid anhydride. For this purpose the two reaction components are melted, and after having been thoroughly admixed, are maintained at a temperature of about 80° to 150° C. for about one to five hours. Both the reaction temperature and the reaction duration are dependent on the reactivity of the components employed. Thereafter, the prereaction product is cooled and ground to powder.

According to a preferred form of execution, 1% to 25%, preferably 2% to 10% by weight of the total amount of the triglycidyl isocyanurate is allowed to react with the totality of the carboxylic acid anhydride.

The prereaction product thus obtained is then admixed with the remaining carboxylic acid anhydrides in the hardenable epoxide resin charge or with the triglycidyl isocyanurate, as well as with the remaining customary epoxide resin adjuvants. The usual known equipment for mixing aggregates is used for this purpose as, for example, ball mills, pebble mills and others.

In order to determine the amount of the triglycidyl isocyanurate to react with the carboxylic acid anhydride, or the reverse, the entire amount of each of the two types of ingredients to be used in the molded plastic premixes is first determined and then the above percentage of one of the ingredients is reacted with substantially all of the other ingredients to form the prereaction product. It is also possible to form two prereaction products by reacting 1% to 25% by weight of one ingredient with 99% to 75% of the other ingredients and by reacting the remainder of the two ingredients before combining with the customary epoxide resin adjuvants discussed above.

The mixture thus obtained can, as it is in the form of an injectable powder, be worked up immediately. However, in many cases it is advantageous to prepare granulates, tablets or platelets from this mixture.

The molded plastic premixes are distinguished by an excellent stability, which as a rule, will last for longer than one year at standard room temperatures.

The final processing of the molded plastic premixes is effected by means of the known hot molds or injection molds. The temperature for these molding processes is adjusted to between 130° C. and 200° C., and the pressure is adjusted to between 30 kg./cm.$^2$ and 400 kg./cm.$^2$. The molding process requires, according to the temperature employed, about 1 to 10 minutes. To assure that the final properties of the molded bodies are actually obtained, it is advantageous to subsequently temper these molded bodies for some time at a temperature of 150° C. to 220° C., for example.

From the molded plastic premixes of the invention molded bodies are obtained, which are endowed with a high degree of stability and with good electrical properties. The molded bodies prepared from the molded plastic premixes of the invention can be utilized for technical and electrical purposes, for example as for conduit supports, for the production of electrical sockets, plugs and switch elements, for the production of bracket plates for electrical conductors, for the manufacturer of casings for electrical equipment and, if desired, for the encasing of electrical conductor rails. In addition, due to the high heat stability of the molded plastics obtained from the premixes of the invention, they can be molded to produce semi-finished articles such as cog wheels, pipes, bolts, plates and the like, which articles are exposed to high thermal stresses.

The following examples serve to illustrate the invention in a comprehensible manner. However, it is to be understood that they are not limitative of the scope of the invention in any manner.

Examples

In the following examples a technical mixture of the high-temperature and low-temperature melting forms of triglycidyl isocyanurate was used, which had an epoxide-oxygen content of 15.1%, such as described in copending commonly-assigned United States patent application Ser. No. 292,725, filed July 3, 1963.

The values given in the examples for the Martens temperature were determined according to DIN 53,458, those for the flexural strength according to DIN 53,452 and those for the impact strength according to DIN 53,453.

Example 1

60 gm. of hexahydrophthalic acid anyhdride were reacted with 3.6 gm. of triglycidyl isocyanurate (7.7% of the total amount of triglycidyl isocyanurate) for 3 hours at a temperature of 150° C. to 160° C. After having been cooled to room temperature, the obtained soft gelatinous mass was admixed in a kneading machine with 252 gm. of ground shale, 43.2 gm. of crystallized triglycidyl isocyanurate and 1.65 gm. of powdered diacyandiamide. The nearly dry mass remained stable for 3 months under exclusion of moisture. The acid anhydride was present in a ratio of about 0.9 mol per mol of epoxide oxygen in the mixture.

Within a period of 5 minutes, sample slabs measuring 120 x 15 x 10 mm. were produced from the mass, obtained in the manner as previously described, by extrusion at a temperature of 160° C. These samples were tempered at 180 °C. over a period of 24 hours. The following values were determined for the tempered molded slabs.

Martens temperature _____° C__ 214
Flexural strength _____kg./cm.$^2$__ 1030
Impact strength _____kp. cm./cm.$^2$__ 4.7

For the purpose of comparison, a batch was prepared by simply melting the above given components and subsequent cooling and pulverizing of same. This batch had a stability of only about 3 weeks.

Example 2

42 gm. of succinic acid anhydride were reacted with 3.9 gm. of triglycidyl isocyanurate and 1.9 gm. of dicyandiamide for 1 hour at 120° C. to 130° C. The gel, which solidified while cooling, was finely pulverized and thoroughly admixed with 210 gm. of ground shale, 45.6 gm. of triglycidyl isocyanurate and 3 gm. of calcium stearate. The mixture was then shifted and compressed into tablets with a diameter of 12 mm. and a thickness of 3 mm.

At a temperature of 160° C. and within 5 minutes, standard rods were molded from these tablets, which were tempered for 24 hours at a temperature of 180° C. The following values were ascertained for the rods.

Martens temperature _____° C__ 213
Flexural strength _____kg./cm.$^2$__ 1040
Impact strength _____kp. cm./cm.$^2$__ 4.7

Examples 3–9

Specifically determined amounts of hardening agents with deficient amounts of crystallized triglycidyl isocyanurate were reacted with one another over a period of 3 hours at a temperature of 150° C. After having been cooled, the reaction mixture was pulverized. The amount of the hardener and that of the triglycidyl isocyanurate are indicated in the first column of the following table.

Thereafter, the prereaction product was worked-up additionally with triglycidyl isocyanurate, dicyandiamide, calcium stearate and fillers (see 4th to 7th col.) into a homogeneous powdery mixture, which, after having been sifted, was compressed into tablets with a 12 mm. diameter and a 3 mm. thickness.

At a temperature of 160° C. and over a period of 5 minutes, test rods were molded from these tablets and tempered for 20 hours at a temperature of 180° C. The subsequent columns of the table indicate the average Martens temperatures, the flexural strength and the impact strength.

All of the tablets of these examples were found to be storable for longer than one year, without showing any change in their molding properties or in the characteristics of the standard rods produced therefrom. (See attached table.)

Example 10

Over a period of 10 hours and at a temperature of 150° C., 136 gm. of triglycidyl isocyanurate and 26.4 gm. of hexahydrophthalic acid anhydride were reacted with one another. Then, together with 162 gm. of ground shale, the product, which had hardened on cooling, was ground over a period of 12 hours in a peeble mill. Thereafter, 413 gm. of ground shale, 147 gm. of pulverized tetrahydrophthalic acid anhydride, 7.5 gm. of diacyandiamide and 4.5 gm. of calcium stearate were added, and the whole was thoroughly admixed. From this batch, tablets were prepared having a diameter of 12 mm. and a thickness of 3 mm.

Standard rods were molded from these tablets within 5 minutes at a temperature of 165° C., which were then tempered for 20 hours at 180° C. The following average values were determined for these rods.

Martens temperature _____° C__ 208
Flexural strength _____kg./cm.$^2$__ 1100
Impact strength _____kp. cm./cm.$^2$__ 6

These tablets had a storability of longer than 10 months.

Example 11

The procedure described in Example 10 was repeated, however, with the difference that, instead of 147 gm. of tetrahydrophthalic acid anhydride being utilized in the final mix for tabletting, the pulverized reaction product consisting of 147 gm. of tetrahydrophthalic acid anhydride and 8 gm. of crystallized triglycidyl isocyanurate was utilized. The reaction between tetrahydrophthalic acid anhydride and triglycidyl isocyanurate was effected over a period of 3 hours at a temperature of 150° C. Tablets were formed from the mix similar as in Example 10.

As indicated in Example 10, standard rods were molded and tempered. The measured values were as follows:

Martens temperature _____° C__ 202
Flexural strength _____kg./cm.$^2$__ 1200
Impact strength _____kp. cm./cm.$^2$__ 6.6

In this case too, the storability of the molded tablets lasted longer than 10 months.

The preceding specific embodiments are illustrative of the practice of the invention. It is to be understood, however, that other expedients known to those skilled in the art can be employed without departing from the spirit of the invention and the scope of the appended claims.

We claim:

1. A process for the preparation of a stable molded plastic premix hardenable to a hardened epoxide resin, based on organic compounds containing more than one epoxide group in the molecule and containing from 66⅔% to 100% of solid triglycidyl isocyanurates, and organic carboxylic acid anhydride epoxide resin hardeners which comprise the steps of (1) preparing at least one prereaction molded plastic based on said solid triglycidyl isocyanurate as a first reactive ingredient and said organic carboxylic acid anhydride epoxide resin hardener as a second reactive ingredient, by reacting from 1% to 25% by weight of the total amount of one of said reactive ingredients with the substantial entirety of the other of said reactive ingredients at temperatures of from 80° C. to 150° C., (2) cooling and subdividing said prereaction molded plastic, (3) adding the remainder of said reactive ingredients and (4) recovering said stable molded plastic premix hardenable to a hardened epoxide resin.

2. The process of claim 1 wherein said solid triglycidyl isocyanurate is crystalline triglycidyl isocyanurate having an epoxide oxygen content of at least 14%.

3. The process of claim 1, step 1, wherein from 2% to 10% by weight of the total amount of one of said reactive ingredients is reacted with the substantial entirety of the other of said reactive ingredients to form said prereaction molded plastic.

4. The process of claim 1, wherein two prereaction molded plastics are formed by reacting from 1% to 25% by weight of the total amount of one of said reactive ingredients with from 99% to 75% by weight of the other of said reactive ingredients to form one prereaction molded plastic and the remainder of the reactive ingredients are reacted under the same conditions to form another prereaction molded plastic.

5. The process of claim 1, step 1, wherein said prere-

TABLE

| Example No. | Hardeners+TGI | TGI, g. | Dicyanodiamide, g. | Calcium stearate, g. | Fillers | Martens— temp., °C. | Flexural strength | Impact strength |
|---|---|---|---|---|---|---|---|---|
| 3 | 48 g. PA+3.3 g | 39 | 0.45 | 1.5 | 210 g. ground shale | 230 | 940 | 4.7 |
| 4 | 50 g. THPA+2.9 g | 37 | 0.6 | 1.5 | ___do___ | 215 | 800 | 4.4 |
| 5 | 59 g. THPA+3.2 g | 43 | 2.2 | 1.5 | 97.5 g. BaSO$_4$ | | | |
| | | | | | 97.5 g. Kaolin | 180 | 450 | 3.5 |
| 6 | 24.5 g. THPA | | | | | | | |
| | 24.5 g. PA+3.2 g | 37.8 | 2.0 | 1.5 | 210 g. ground shale | 207 | 1,050 | 4.7 |
| 7 | 24.5 g. THPA+1.6 g | 37.8 | 2.0 | 1.5 | ___do___ | 206 | 1,000 | 4.5 |
| 8 | 127 g. THPA+20 g | 69 | 4 | 3 | 371 g. ground shale | 197 | 1,040 | 6 |

PA=phthalic acid anhydride; THPA=tetrahydrophthalic acid anhydride; TGI=triglycidyl isocyanurate.

action molded plastic is the reaction product of from 2% to 10% by weight of the total amount of said solid tiglycidyl isocyanurate with the entirety of said organic carboxylic acid anhydride being an organic dicarboxylic acid anhydride.

6. The stable molded plastic premix hardenable to a hardened epoxide resin produced by the process of claim 1.

7. The process of claim 1, step 3, wherein customary epoxide resin adjuvants selected from the group consisting of epoxide hardening accelerating agents, fillers, epoxide resin lubricants, stabilizers, dyes and plasticizers, are also added.

8. The process of claim 7 wherein from 0.5% to 5% by weight, based on the triglycidyl isocyanurate, of an epoxide hardening accelerating agent is added as said customary epoxide resin adjuvant.

9. The process of claim 8 wherein said epoxide hardening accelerating agent is dicyandiamide.

References Cited

UNITED STATES PATENTS 3,337,509   8/1967   Budnowski.

WILLIAM H. SHORT, Primary Examiner

T. PERTILLA, Assistant Examiner

U.S. Cl. X.R.

260—830